F. B. CONVERSE.
COLLAPSIBLE TIRE MAKING CORE.
APPLICATION FILED JULY 24, 1916.
1,264,613.
Patented Apr. 30, 1918.
2 SHEETS—SHEET 1.
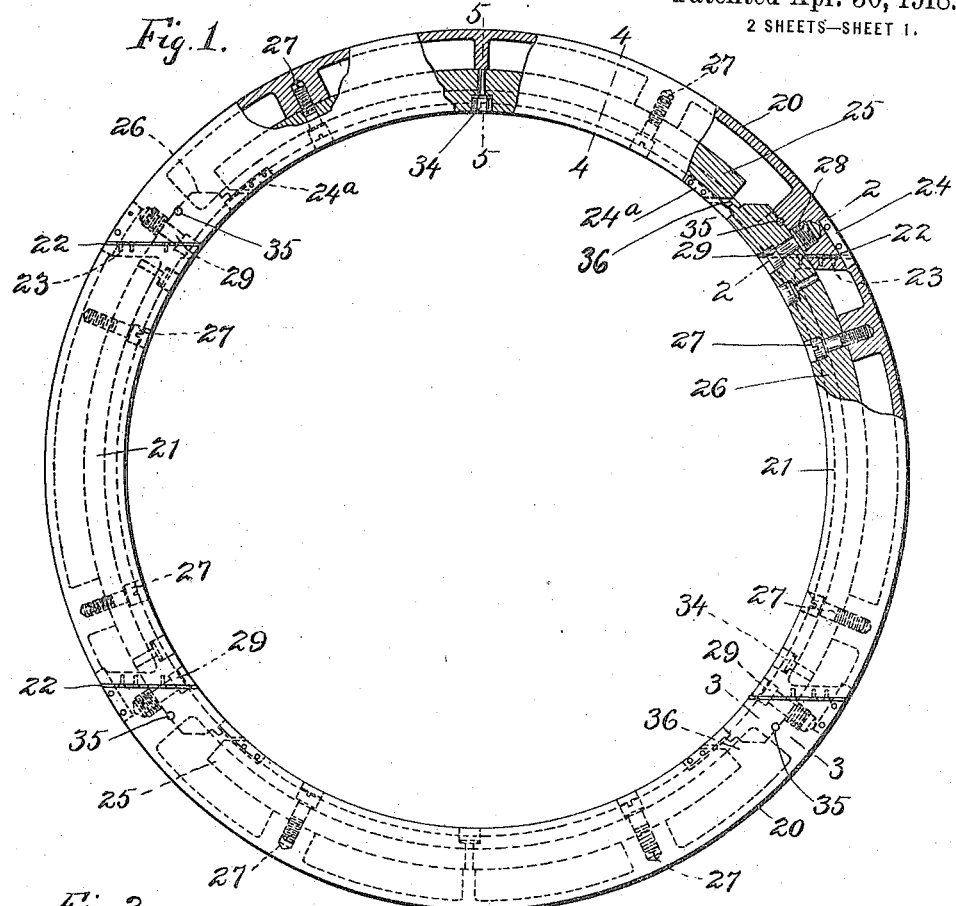
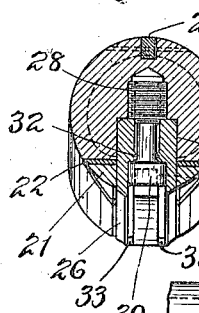
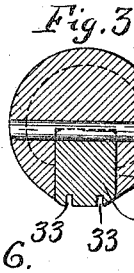
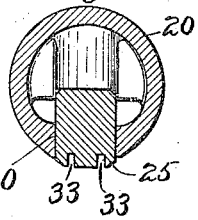
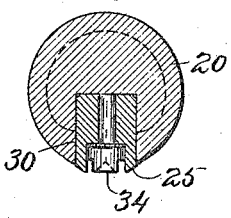
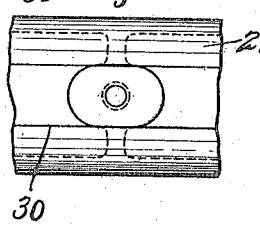
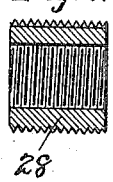
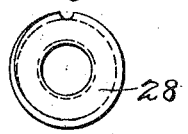
INVENTOR.
F. B. Converse
BY Robert M. Pierson
ATTORNEY

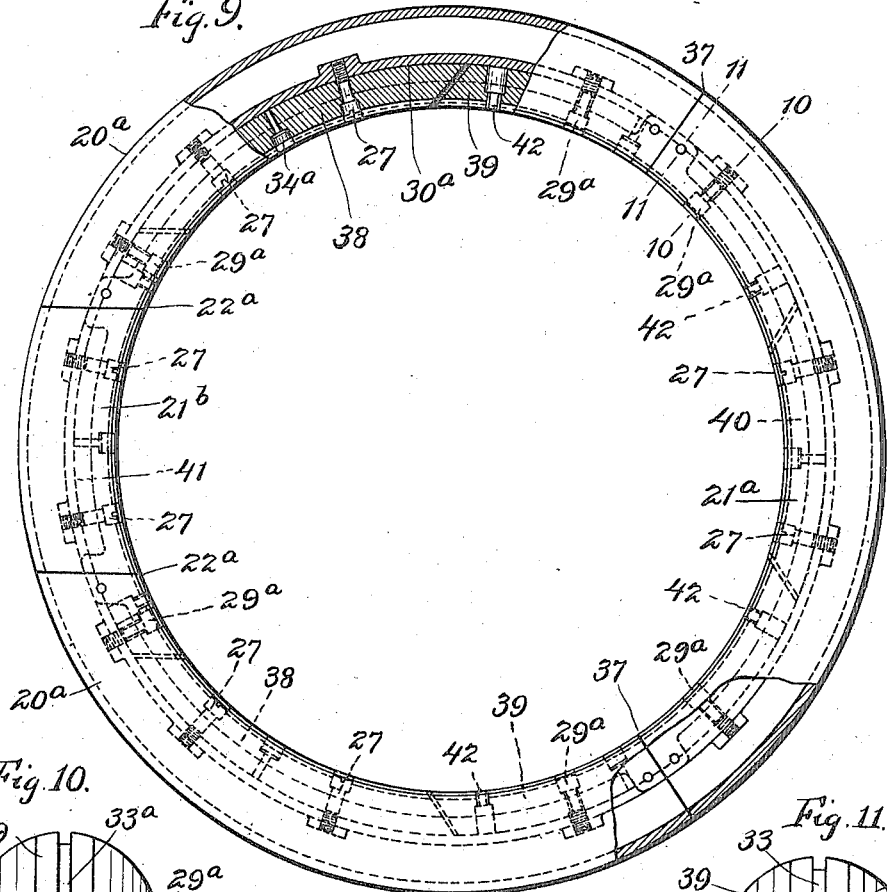

UNITED STATES PATENT OFFICE.

FRANCIS B. CONVERSE, OF AKRON, OHIO, ASSIGNOR TO THE B. F. GOODRICH COMPANY, OF NEW YORK, N. Y., A CORPORATION OF NEW YORK.

COLLAPSIBLE TIRE-MAKING CORE.

1,264,613.   Specification of Letters Patent.   Patented Apr. 30, 1918.

Application filed July 24, 1916. Serial No. 110,842.

*To all whom it may concern:*

Be it known that I, FRANCIS B. CONVERSE, a citizen of the United States, residing at Akron, in the county of Summit and State of Ohio, have invented certain new and useful Improvements in Collapsible Tire-Making Cores, of which the following is a specification.

This invention relates to annular, collapsible, tire-making cores of a type especially adapted to the manufacture of cord tires by the method of wrapping the cord layers completely around the core, which latter is preferably substantially circular in cross section. In an application Serial No. 110,841 filed by me concurrently herewith, I have described and claimed a collapsible core of this general type, and the present invention is in some respects an improvement on that core.

Of the accompanying drawings,

Figure 1 represents a side elevation, partly in section, showing a collapsible core constructed according to my invention.

Figs. 2, 3, 4 and 5 are cross sections on the correspondingly numbered lines of Fig. 1.

Fig. 6 is an inner face view of one of the outer segments with its inner segment removed.

Fig. 7 is a detail section of one of the screw bushings.

Fig. 8 is an end view of said bushing.

Fig. 9 is a side elevation, partly in section, showing a modification.

Figs. 10 and 11 are cross sections on the correspondingly numbered lines of Fig. 9.

Fig. 12 is an inner face view of a portion of the core.

Fig. 13 is a detail side elevation, showing one of the hardened inset pieces for supporting the core on a chuck.

Fig. 14 is an end view of said piece.

Referring first to Figs. 1 to 8 inclusive, the main or outer body of the core is made up of a pair of long segments 20 and a pair of shorter segments 21, which abut at their ends on four non-radial, transverse, division planes which are nearly parallel but slightly convergent outwardly in pairs on opposite sides of the core, so as to permit the ready removal of the shorter core sections 21 from between the ends of the longer sections 20. These sections are cast hollow for the sake of lightness and provided with suitable bosses where they contact radially with the inner retaining segments to be described. 22, 22 are plates secured by small screws 23 to the ends of the shorter core sections 21 and serving as wear-plates and also as fillers for the saw-cuts formed in dividing an initially endless ring into segments. There is further provided at each joint a key 24 pinned in a slot on one of the abutting segments and entering a slot in the other segment to interlock the segments against lateral displacement, but these keys can be dispensed with.

The segments 20, 21 are provided at 30 in their inner peripheries with a deep parallel-sided groove or slot, and in the groove are located a series of four segments 25, 26 whose inner peripheries are nearly flush with the surface of the core body. The segments 25 attached to the body segments 20 terminate short of both ends of the latter and act merely as fillers, it being a convenient method of obtaining the tongue-and-groove connection on the inner sides of the joints between body segments 20, 21, to form a complete circular groove 30 and fill it with the segments 25, 26 forming substantially a complete annulus or retaining band extending circumferentially on the inner periphery of the core. The segments 25 are detachably connected to the segments 20 by means of radial screws or bolts 27 with slotted heads countersunk in said segments 25 and accessible from the inner periphery of the core.

The segments 26 are secured by similar screws 27 to the body segments 21 and project at both ends beyond the ends of the latter so as to overlap the segments 20, their projecting ends being secured to the segments 20 by means of radial screws or bolts 29, threaded into hardened steel bushings 28 in the segments 20. The heads of said screws are countersunk in the segments 26 and accessible from the inner periphery of the core, said heads being formed with square recesses 31, represented in dotted lines in Fig. 2, for the reception of a suitable turning tool. An internal thread 32 is provided in the segment 26 just over the radial screw 29 and at some distance from the internal thread in bushing 28, so that screw 29 will be prevented from falling out of the segment 26 when it is unscrewed from the segment 20, but may be removed by further turning.

24ª, 24ª are keys similar in function to the key 24 for interlocking the ends of the inner segments 25, 26, but their use is not essential.

The inner periphery of the segments 25, 26 is formed with two parallel circumferential grooves 33 for the reception of a pair of cutting knives to split open the inner periphery of the tire casing by the removal of a strip of its wall structure. The segments 25 and 26 are further provided with hardened inset pieces 34 with conical recesses for the reception of the supporting pins on the arms of the core-rotating chuck of a tire-building machine.

Transverse keys or dowels 35, occupying grooves in the outer faces of the segments 26, are provided near the ends of the segments 20, in order to prevent the expansion of the core and the opening of the joints thereof due to lost motion in the screw connections at 29.

In operating this collapsible core, the inner segments 25, 26 may be left permanently connected with their respective outer segments 20, 21 by means of the screws 27. When the tire has been built up and split open on its inner periphery, the screws 29 are disconnected from the bushings 28 in the segments 20, and this permits the removal of the shorter body segments 21, after which the longer segments 20 may be readily removed. Short spaces 36 are left between the adjacent ends of the segments 25, 26 to admit the end of a screw-driver or similar tool for prying the shorter segments out of place when necessary.

The modification shown in Figs. 9 to 14 inclusive differs from the preferred form just described, principally in the use of different-shaped body segments in the core and a larger number of retaining segments in the band or inner ring.

There are three long segments 20ª and 21ª having squared or radial abutting ends or joints at 37, and a shorter segment 21ᵇ having slanting joints or end abutments with the segments 20ª, converging slightly in an outward direction to permit the inward withdrawal of said segment 21ᵇ.

The core body in this case has a solid-walled groove 30ª on its inner periphery for the reception of the inner retaining band or ring, and the latter is made up of six segments 38, 39, 40, 41, of which the segments 39 and 41 overlap the four joints 37 and 22ª of the body segments. The segments 38 and 40 are merely fillers and are detachably secured to the body segments 20ª and 21ª by means of screws or bolts 27, which however need not be disturbed in disassembling the core to remove it from a tire. The retaining segment 41 is secured in a similar manner to the body segment 21ᵇ by screws 27.

Other screws or bolts 29ª are provided for detachably connecting the ends of the retaining segment 41 to the ends of the body segments 20ª and for detachably connecting the retaining segments 39 to the ends of the body segments 20ª and 21ª.

Hardened chucking pieces 34ª and dowels 35 are provided, similar in function to the parts 34 and 35 previously described. In the retaining segments 39 are formed button-hole slots 42 for the reception of a suitably-formed hooking tool to assist in the removal of these segments.

The segments of the inner retaining band in this case are formed with a single peripheral groove 33ª for the reception of a knife to split the carcass open along a single line.

When disassembling this form of core, the screws 29ª are loosened, the body segment 21ᵇ with its retaining segment 41 is removed inwardly and the retaining segments 39 are also removed. The remaining segments 20ª and 21ª of the core body may then be taken out of the tire casing.

I claim,

1. A collapsible tire-making core comprising a plurality of separable segments, and annular segmental retaining means mounted within said core and extending on the periphery circumferentially thereof for holding the core segments against circumferential separation.

2. A collapsible tire-making core comprising a plurality of separable segments, said segments each provided in the tire-forming body thereof with a portion of an annular groove, and a segmental retaining band in said groove extending on the periphery circumferentially of the core and serving to hold adjacent core segments against circumferential separation.

3. A collapsible annular tire-making core divided transversely into a series of body segments each of which is formed with a portion of an annular groove on its inner periphery, annular segmental filling and retaining means in the groove overlapping the joints in the body segments, and radial securing devices normally lying wholly within the core body, and accessible from the inner periphery of the core, for connecting together said body segments and retaining means.

4. An annular collapsible tire-making core comprising a plurality of separable segments and continuously grooved on its inner periphery, retaining and filling segments in the groove substantially flush with the inner peripheral surface of the core body, and radial screws accessible from the inner periphery of the core for detachably connecting the last-said segments to the body segments.

In testimony whereof I have hereunto set my hand this 22nd day of July 1916.

FRANCIS B. CONVERSE.